Patented Mar. 18, 1924.

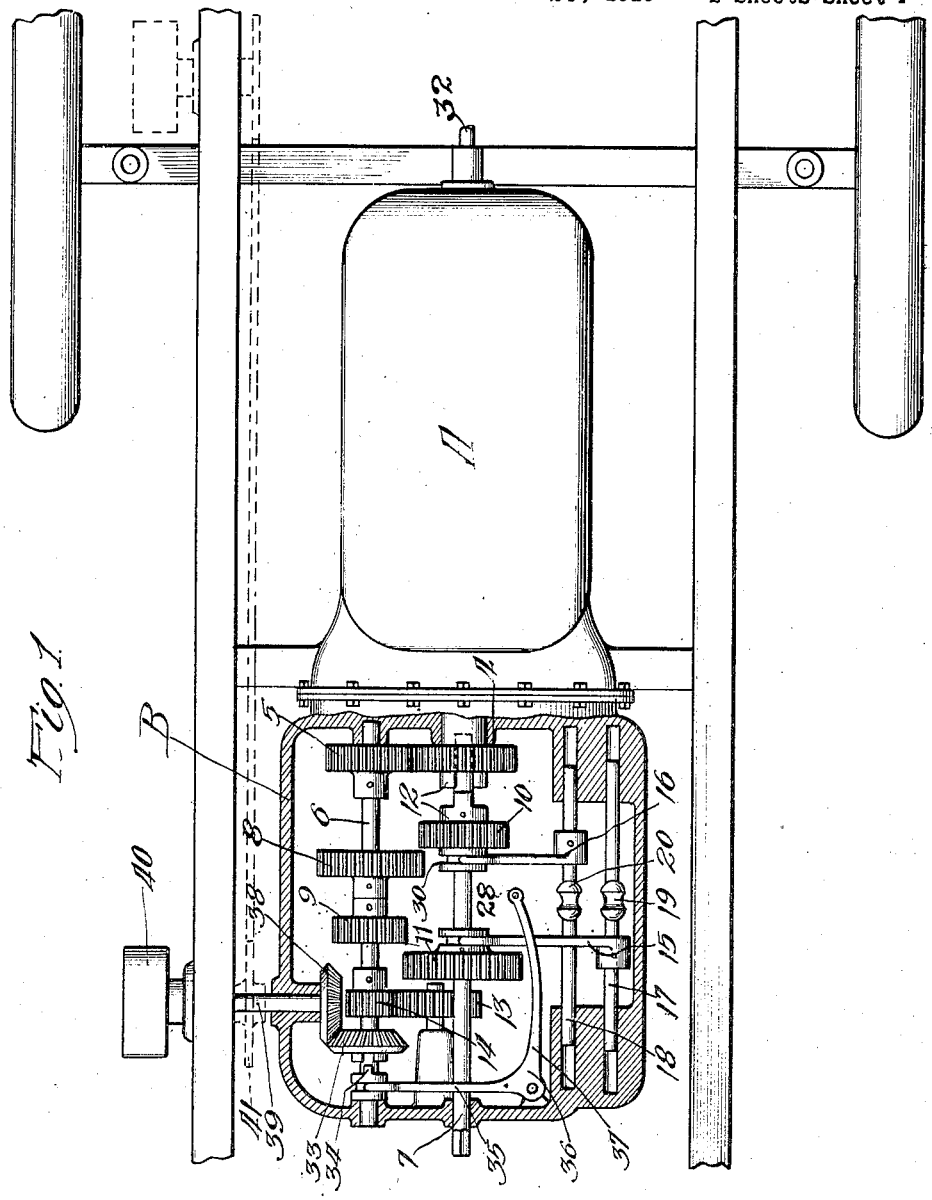

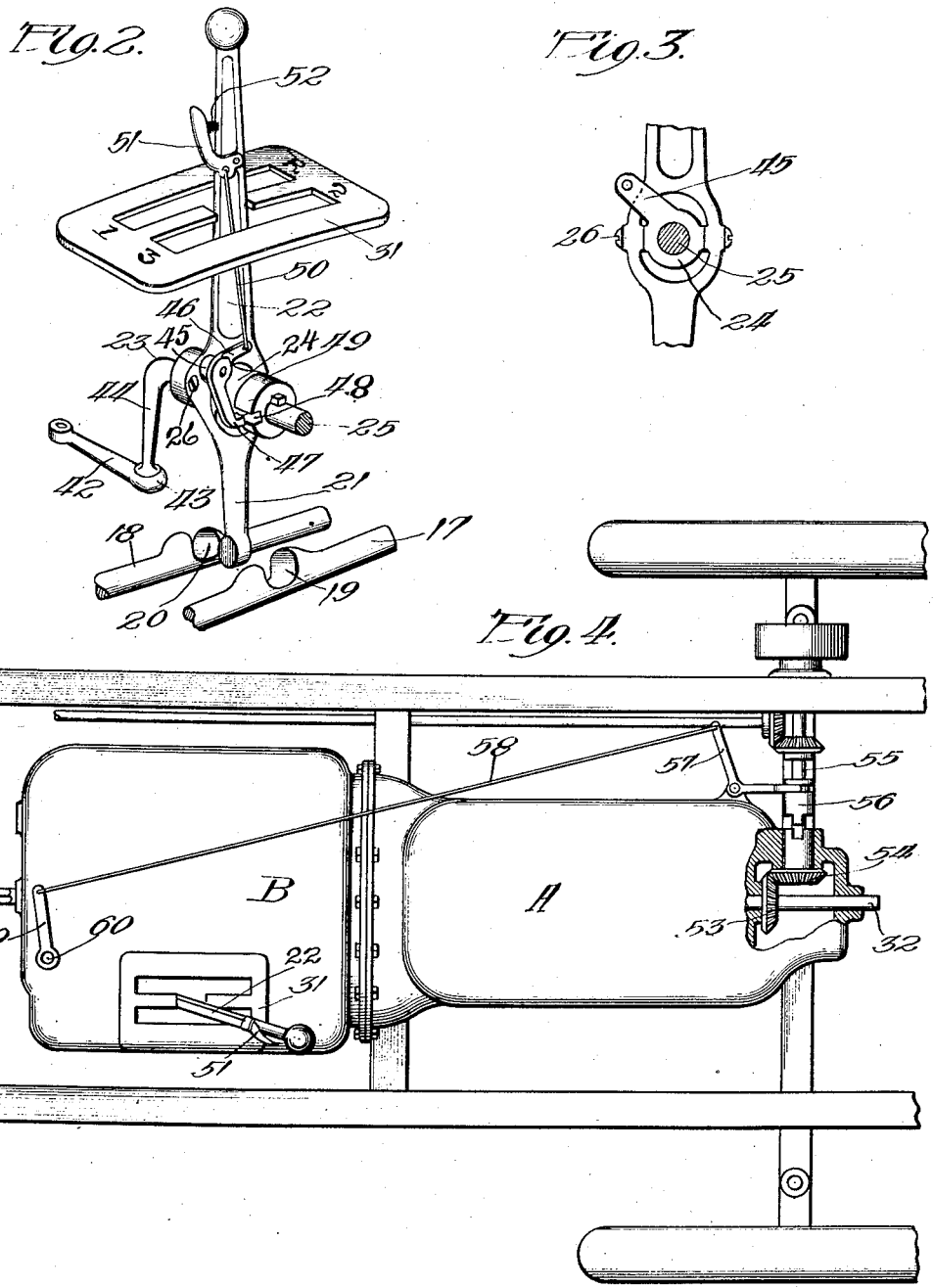

1,487,445

UNITED STATES PATENT OFFICE.

HARRY S. DICKINSON, OF MOLINE, ILLINOIS, ASSIGNOR, BY MESNE ASSIGNMENTS, TO MOLINE PLOW COMPANY, INCORPORATED, OF MOLINE, ILLINOIS, A CORPORATION OF VIRGINIA.

POWER-TAKE-OFF MECHANISM FOR MOTOR VEHICLES.

Application filed October 24, 1919. Serial No. 333,064.

*To all whom it may concern:*

Be it known that I, HARRY S. DICKINSON, a citizen of the United States, residing at Moline, in the county of Rock Island and State of Illinois, have invented certain new and useful Improvements in Power-Take-Off Mechanism for Motor Vehicles, of which the following is a specification.

This invention relates to certain connections conformable to the structural requirements of motor vehicles of standard type, by which power generated by the motor can be made available for use, particularly on farms, either as a means for operating pumps, feed cutters, saws, or like farm equipment ordinarily operated from a stationary power plant, or which can be availed of for use concurrently with the driving of the vehicle, as a means for operating the conveyor and beater of a manure spreader, or for other like purpose associated with the manipulation of movable farm vehicles or implements. In short, the object and purpose of the present invention is to so arrange the power take-off that it may be employed independently of the transmission of power for the driving of the vehicle but controlled by the same gear shift mechanism ordinarily employed for that purpose. The invention therefore consists in certain attachments to the transmission gears and gear shift lever so arranged as not to require any substantial modification of the structure of either of these standardized mechanisms, thereby enabling the operator to drive the vehicle and to manipulate the power take-off by means of an ordinary gear shift lever universally employed in motor vehicles of standardized type.

In the drawings:

Figure 1 is a view of the chassis of an automobile showing the gear box broken away, and showing the power connections of the present invention applied to gearing of standard type;

Fig. 2 is a perspective view of the gear shift lever with the control devices of the present invention mounted thereon;

Fig. 3 is a sectional detail through the control shaft upon which the gear shift lever is mounted;

Fig. 4 is a view of a chassis showing a modification in the connections for the purpose of taking power from the crank shaft of the motor.

In the drawings, A indicates the motor casing, and B the transmission casing of a motor vehicle of the usual type, the gear casing being broken away to show the interior arrangement of the transmission gears. The power from the engine is transmitted through the usual clutch appliances, not shown, to a preliminary driving gear 4. This gear is in constant mesh with a secondary driving gear 5 mounted upon a countershaft 6 of the usual character. The preliminary driving gear 4 sockets the forward end of a transmission shaft 7 which affords the driving connection through the customary universal joint and differential gear to the rear axle, these latter devices being of the ordinary standardized construction.

The countershaft 6 has rigidly mounted thereon the gears 8 and 9, the former co-operating with the slidably mounted gear 10 on the transmission shaft, and the latter co-operating with the slidably mounted gear 11 on the transmission shaft. The sliding gear 10 and the preliminary gear 4 are provided with co-acting clutch faces 12 in the usual manner. These gear ratios are all standard and will be fully understood by all those conversant with motor car construction, and are adapted to impart three speeds forward and reverse speed when brought into varying relations with one another so that the countershaft will be constantly rotated.

First speed ahead is secured by throwing the gear 11 into mesh with gear 9 on the countershaft; second speed, by throwing gear 10 into mesh with gear 8; third speed, by throwing gear 10 into mesh with gear 4; and reverse by throwing gear 11 into mesh with an intermediate gear 13 constantly in train with a gear 14 on the countershaft. These adjustments are effected by means of the usual shifting fingers 15 and 16 carried by slide bars 17 and 18 respectively. The slide bar 17 is provided in its center with a recessed lug 19, and the slide bar 18 with a similar recessed lug 20, which lugs, best shown in Fig. 2, stand in transverse alignment with the lower end 21 of the gear shift lever 22 when the latter occupies the neutral position. The gear shift lever is divided at its fulcrum point 23 to embrace a collar 24 rotatably mounted upon a control shaft 25, the lever being trunnioned on the collar by means of aligned oppositely disposed pivot pins 26, the arrangement being one which permits the gear shift lever to be moved forward and back and also to be shifted laterally to throw its operating lower end into engagement with either of the recessed lugs on the slide rods in order to effect a fore and aft movement of either of the slide rods, depending upon the gear adjustment desired.

The slide rod 17 is provided with the inwardly projecting finger 15, the inner end of which engages a collar 28 on the gear 11, and in like manner the shaft 18 is provided with the inwardly projecting finger 16 which engages a collar 30 on the gear 10, the arrangement being such that when the gear shift lever is thrown laterally in either direction from the neutral position and thereafter moved in either a fore or aft direction, the desired gear adjustment will be effected.

The gear shift lever projects upwardly through the usual H plate 31, the various gear adjustments being indicated by the numerals 1, 2, 3, and the letter R on the surface of the plate. The above mechanisms find their counterpart or equivalent in most motor vehicles of modern construction, and the application of the present invention to these mechanisms involves no change or modification whatsoever in the construction or mode of operation of the gear shifting devices.

The present invention is designed to utilize power derived either from the constantly rotating countershaft 6, as in Fig. 1, or from the constantly rotating crank shaft 32, and to control the utilization of this power by suitable manipulation of the gear shift lever without interfering with the functions of the latter when controlling the forward and reverse movements of the vehicle. With this end in view, as shown in Fig. 1, the countershaft 6 has loosely mounted thereon a bevel pinion 33 which may be clutched to the shaft by the initial movement of a sliding dog clutch member 34, which is keyed to the shaft and is operable by the movement of the inner arm 35 of a bell crank lever 36, the outer arm 37 of which terminates at a point in transverse alignment with the recessed lugs 19—20 when the same stand in neutral position. The bevel pinion 33 is in constant mesh with a bevel pinion 38 on the inner end of a power take-off shaft 39, which may carry a power pulley 40 or chain and sprocket connections 41 or a combination of the two, or any other suitable transmission devices for utilizing power derived from the vehicle motor.

The inner end of the bell crank lever has pivoted thereto a link 42 which, with the parts in neutral position, will extend outwardly in parallel alignment with the two recessed lugs 19—20, and the link 42 is secured by ball and socket connection 43 to the lower end of an arm 44, which depends from the inner end of the control shaft 25 upon which the gear shift lever is mounted.

In the ordinary operation of the motor vehicle, and when it is not desired to utilize the power take-off of the present invention, the arm 44 will be maintained in vertical relation with respect to the link 42, and this relation of the parts has the effect of thrusting the inner end of the bell crank lever inwardly the maximum distance, thereby holding the dog clutch 34 out of clutching relation with respect to the bevel pinion 33. It is evident, however, that a rocking movement of the arm 44 in either direction will have the effect of drawing back the inner end of the bell crank lever, thereby throwing the opposite end of the lever inwardly, with the result that the dog clutch will be thrown into locked relation with the bevel pinion 33, and power from the constantly rotating shaft imparted to the take-off shaft 39.

The means for imparting a rocking movement to the control shaft 25 will now be described. The collar 24 on the shaft 25 is provided with an arm 45 which provides a mounting for a bell crank lever 46, the lower end of which is provided with a tooth 47 which is adapted to be thrown into engagement with a recess 48 in a collar 49 which is keyed or otherwise rigidly secured to the operating shaft 25. The upper end of the bell crank lever 46 has connected thereto a latch rod 50, which in turn connects with a thumb latch 51 pivoted near the upper end of the gear shift lever and held in retracted position by the action of a spring 52.

If it is desired to utilize power derived from the crank shaft at the forward end of the motor rather than from a power take-off shaft journaled in the gear box, a similar arrangement of parts may be provided, which will now be described. The constantly rotating crank shaft 32 is provided with a bevel pinion 53 which meshes with a bevel pinion 54 loosely mounted upon the inner end of a power takeoff shaft 55, and adapted to be clutched therewith through the action of a dog clutch 56 controlled by a bell crank lever 57 operated by a draw rod 58 which is pivoted to an arm 59 mounted upon a rock shaft 60. The arm 59 corresponds in function and operation with the arm 35 of the bell crank lever already described, and the rock shaft 60 has secured thereto an arm corresponding in all respects to the inner arm 37 of the bell crank lever previously described. This arrangement constitutes in effect a bell crank lever, one arm of which is offset with respect to the other and located outside of the gear casing, but the action is precisely the same as that heretofore described.

In operation, when it is desired to drive the vehicle without utilizing the power takeoff features, the thumb latch 51 is allowed to remain in the retracted position shown and the gear shift lever can thus be moved back and forth and shifted from side to side in the ordinary way without imparting any rotative movements to the control shaft 25 and without disturbing the vertical position of the depending arm 44 so that full control of the gear transmission for the vehicle can be maintained in the usual way without utilizing the special features of the present invention.

When, however, it is desired to operate the power take-off shaft, with the engine running and thrown out of clutch with the transmission, the thumb latch will be depressed thereby throwing the bell crank lever tooth 47 into engagement with the recess 48 in the collar 49 on the control shaft, and with the connection thus established the gear shift lever can be moved out of neutral and thrown to any one of its fore and aft positions, after which the thumb latch may be released and the gear shift lever thrown back to neutral position, leaving the power take-off connections in clutched relationship with the countershaft. Thereafter, when the main clutch pedal is released, the engine will constantly drive the countershaft, irrespective of any gear shifting manipulation of the gear shift lever, so that the engine power can be utilized with the motor vehicle standing stationary, or with the motor vehicle driven, depending upon the character of the work required.

Thereafter, when it is desired to disengage the power take-off mechanisms, the engine can be unclutched, as is customary in the shifting of automobile gears, the gear shift lever rocked forward or back as the case may be to a position in which the bell crank lever tooth will again engage the notched collar on the control shaft 25, after which engagement, by means of the thumb latch, the control lever can be turned back to neutral position, disengaging the power take-off and restoring the parts to initial position.

It will be observed that the operations attending the clutching and unclutching of the power take off train are similar to those which attend the ordinary manipulation of the gear shift lever, that is to say, prior to each adjustment the engine clutch will be disengaged and the new adjustment effected before reclutching the parts with the engine, the only difference in the present case being that the thumb latch will be depressed concurrently with the throwing of the gear shift lever out of neutral position, whereas in the ordinary driving manipulations the thumb latch will remain undepressed.

It is plain that the mechanism of the present invention is of a nature which permits the power to be employed either for the running of farm machinery or mechanisms which are independent of the vehicle, or in short that the motor may be used as a stationary power plant, and at the same time the present mechanism is designed to permit the utilization of power in connection with mechanisms which are mounted and transported with the vehicle itself, such, for instance, as manure spreading appliances, body hoist mechanism for the discharge of grain or coal, or combinations in which the power is utilized partly in connection with devices on the vehicle and partly in connection with devices like grain hoists which are separate and apart from the vehicle itself.

It will be seen from the foregoing description that the present invention is one which enables the owner of an automobile or motor truck of the usual type to utilize power derived therefrom in a large number of ways, and to control the utilization of such power by the usual and ordinary lever appliances customarily provided for controlling the movements of the vehicle itself, and without modification of such devices, and with but slight addition thereto.

I claim:

1. In a power-take-off mechanism for motor vehicles, the combination of a motor, a main transmission shaft, a counter-shaft, gears on the respective shafts adapted to establish varying speed ratios, a gear shift lever movable to different positions to vary the speed ratios, connections for varying the gear ratios by movements of the lever, a power-take-off shaft, and means for entraining the power-take-off shaft by movements of the gear shift lever to its positions for varying the gear ratios of the transmission.

2. In power take-off mechanism for motor vehicles, the combination of a motor, a main transmission shaft, a countershaft, gears on the respective shafts adapted to establish varying speed ratios, a gear shift lever, connections for varying the gear ratios by movements of the lever, a power take-off shaft, and means for entraining the power take-off shaft by movements of the gear shift lever, said means comprising latch mechanism carried by the gear shift lever and adapted to lock said lever to the connections provided for entraining the power take-off shaft, substantially as described.

3. In power take-off mechanism for motor vehicles, the combination of a motor, a main transmission shaft, a countershaft, gears on the respective shafts adapted to establish varying speed ratios, a gear shift lever mounted for lateral and fore and aft movement for effecting varying gear ratios, a rock shaft upon which the gear shift lever is adapted to swing, latch mechanism for locking the gear shift lever to the rock shaft, a power take-off shaft, means for entraining the power take-off shaft with the motor, and connections between the rock shaft and said entraining means for actuating the latter by movements of the gear shift lever when latched to the rock shaft, substantially as described.

4. In power take-off mechanism for motor vehicles, the combination of a motor, a main transmission shaft, a countershaft, gears on the respective shafts adapted to establish varying speed ratios, a gear shift lever mounted for lateral and fore and aft movement for effecting varying gear ratios, a rock shaft upon which the gear shift lever is adapted to swing, latch mechanism for locking the gear shift lever to the rock shaft, a power take-off shaft, gears for entraining the power take-off shaft with mechanism driven by the motor, a clutch for making and breaking connection between said gears and said motor driven mechanism, lever mechanism for actuating said clutch, and connections between said lever mechanism and said rock shaft for clutching the parts when the rock shaft is latched to the gear shift lever and the latter is moved from neutral position, substantially as described.

5. In power take-off mechanism for motor vehicles, the combination of a motor, a main transmission shaft, a countershaft, gears on the respective shafts for establishing varying speed ratios, a pair of slide bars, arms on the slide bars for effecting adjustments of the gears, a gear shift lever adapted to be swung laterally to effect engagement with either of the slide bars and adapted to be swung in a longitudinal direction to effect a shifting of the intended gear, a rock shaft upon which the gear shift lever is mounted, an arm depending from the rock shaft, latch mechanism carried by the gear shift lever for locking the latter to the rock shaft, a power take-off shaft, gears for entraining the power take-off shaft with the mechanism driven by the motor, a clutch for effecting such entraining, and connections between said clutch and said depending arm for locking the clutch by a fore and aft movement of the gear shift lever when latched to the rock shaft, substantially as described.

6. In power take-off mechanism for motor vehicles, the combination of a motor, a main transmission shaft, a countershaft, gears on the respective shafts for establishing varying speed ratios, a pair of slide bars, arms on the slide bars for effecting adjustments of the gears, a gear shift lever adapted to be swung laterally to effect engagement with either of the slide bars and adapted to be swung in a longitudinal direction to effect a shifting of the intended gear, a rock shaft upon which the gear shift lever is mounted, an arm depending from the rock shaft, latch mechanism carried by the gear shift lever for locking the latter to the rock shaft, a power take-off shaft, gears on the power take-off shaft and the countershaft respectively, one of said gears being loosely mounted, a clutch for locking the loose gear to the shaft on which it is mounted, and connections between said clutch and said depending arm for operating the clutch by a fore and aft movement of the gear shift lever when latched to the rock shaft, substantially as described.

7. In power take-off mechanism for motor vehicles, the combination of a motor, a main transmission shaft, a countershaft, gears on the respective shafts for establishing varying speed ratios, a pair of slide bars, arms on the slide bars for effecting adjustments of the gears, a gear shift lever adapted to be swung laterally to effect engagement with either of the slide bars and adapted to be swung in a longitudinal direction to effect a shifting of the intended gear, a rock shaft upon which the gear shift lever is mounted, an arm depending from the rock shaft, latch mechanism carried by the gear shift lever for locking the latter to the rock shaft, a power take-off shaft, gears on the power take-off shaft and the countershaft respectively, one of said gears being loosely mounted, a clutch for locking the loose gear to the shaft on which it is mounted, and connections between said clutch and said depending arm for locking the clutch by a fore and aft movement of the gear shift lever when latched to the rock shaft, said connections comprising a bell crank, one arm of which engages the clutch, and a link connecting the other bell crank arm with the depending arm, said link being positioned to move the bell crank lever when the depending arm is swung in either direction, substantially as described.

8. In power take-off mechanism for motor vehicles, the combination of a motor, a transmission shaft, a series of gears for effecting differing gear ratios between the motor and the transmission shaft, a gear shift lever for said gears, power take-off mechanisms, means for entraining said power take-off mechanisms with one of the motor driven elements, and clutch mechanism operable by movements of the gear shift lever for effecting a clutching of the power take-off mechanisms, substantially as described.

9. In power take-off mechanism for motor vehicles, the combination of a motor, a transmission shaft, a series of gears for effecting differing gear ratios between the motor and the transmission shaft, a gear shift lever for said gears, power take-off mechanisms, means for entraining said power take-off mechanisms with one of the motor driven elements, clutch elements for effecting said entraining, and levers and connections between said clutch elements and said gear shift lever adapted to be thrown into latched relation therewith for effecting clutching and unclutching operations by movements of the gear shift lever, substantially as described.

10. In power take-off mechanism for motor vehicles, the combination of a motor, a transmission shaft, a series of gears for effecting differing gear ratios between the motor and the transmission shaft, a gear shift lever for said gears, power take-off mechanisms, means for entraining said take-off mechanisms with one of the motor driven elements, clutch mechanism operable by movements of the gear shift lever for effecting a clutching of the power take-off mechanisms, clutch elements for effecting said entraining, a latch carried by the gear shift lever, and connections between said latch and said clutch elements for effecting clutching and unclutching thereof by movements of the gear shift lever, substantially as described.

11. An automotive vehicle having a power plant, transmission mechanism, means operable by a single lever movable to various positions for controlling the transmission, a power-take-off mechanism, and means for rendering the lever operative to control the power-take-off mechanism by movements to one or more of its various positions for controlling the transmission.

12. An automotive vehicle having a motor, transmission mechanism, means including a gear shift lever movable to various positions for controlling the transmission mechanism, power-take-off mechanism, and means operable by the gear shift lever by movements of that lever into one or more of its positions for controlling the transmission mechanism for throwing the power-take-off mechanism into and out of operation, said means permitting the gear shift lever to be used to shift the transmission without disturbing the power-take-off mechanism.

13. An automotive vehicle having a power plant, transmission mechanism, a power-take-off, and means operable by a single lever for starting and stopping the power-take-off and for subsequently controlling the transmission with the power-take-off either in operation or out of operation.

14. An automotive vehicle having a motor, a transmission mechanism, means including a gear shift lever for controlling the transmission, a power take-off mechanism, and means operable by the gear shift lever for controlling the power take-off mechanism arranged so that the power take-off mechanism may be thrown into operation by movements of the gear shift lever in either direction from neutral.

15. An automotive vehicle having a motor, a transmission mechanism, means including a gear shift lever for controlling the transmission mechanism, a power take-off mechanism, and means operable by movements of the gear shift lever in either direction from neutral to throw the power take-off mechanism into operation, said means being arranged so that the gear shift lever may thereafter be used to control the transmission without affecting the power take-off mechanism.

HARRY S. DICKINSON.